Dec. 20, 1932.   H. LAWARREE   1,891,426
PROCESS OF MANUFACTURING ALKALI METAL NITRATES
Filed March 2, 1931
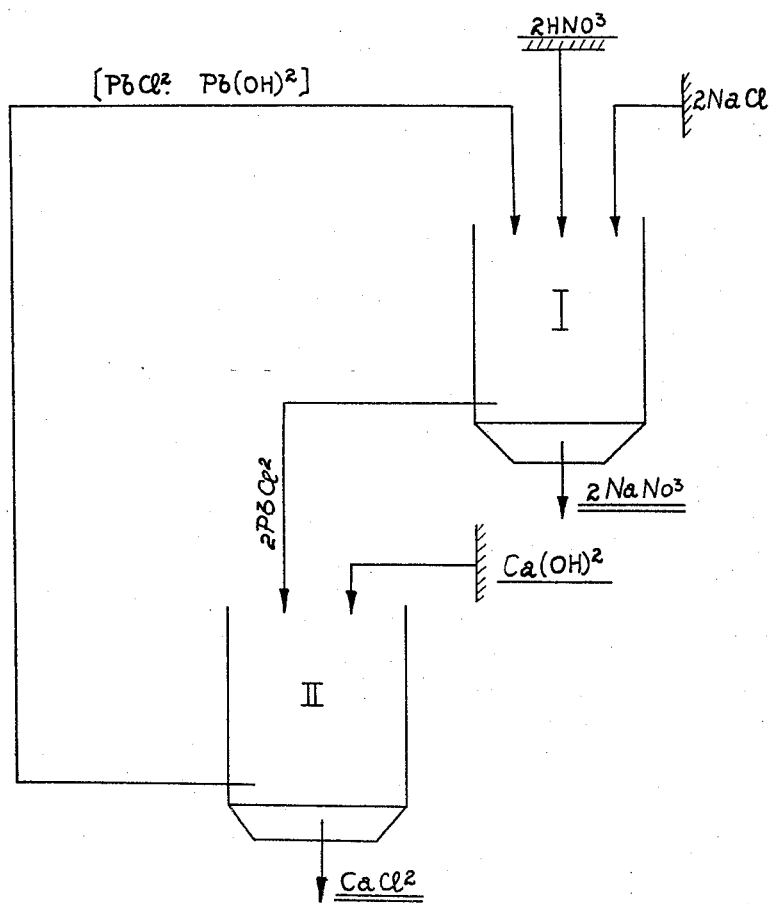
Inventor:
Henri Lawarree
By Emil Bönnelycke
Attorney Patented Dec. 20, 1932

1,891,426

UNITED STATES PATENT OFFICE

HENRI LAWARREE, OF BRUSSELS, BELGIUM

PROCESS OF MANUFACTURING ALKALI METAL NITRATES

Application filed March 2, 1931, Serial No. 519,637, and in Belgium March 25, 1930.

This invention refers to a cyclic process for the manufacture of sodium or potassium nitrate from the corresponding chlorides.

Various processes are known in which a soluble salt of lead is used in a cycle, which by means of double decomposition give on the one hand the required alkali metal salt and on the other hand an insoluble salt of lead.

Especially processes are known in which the original nitric acid is added to carbonate or hydroxide of lead. The lead nitrate obtained gives by double decomposition with an alkali metal chloride the required alkali metal nitrate and a precipitate of lead chloride, which is intended to return in a cycle to the original state of lead carbonate or hydroxide.

These processes have several disadvantages.

The use of lead carbonate demands that the reaction take place in closed vessels, a partial supplementary cycle in $CO_2$ and the use of ammonia to regenerate the lead carbonate with the formation of chloride of ammonium combined with that of the alkali metal nitrate.

As regards the use of lead hydroxide, this causes the filters to become choked because of its pasty condition.

Finally in both cases, it is necessary, after the double decomposition, to purify the solution of nitrate in order to remove a considerable quantity of lead salts, because of the solubility of the lead chloride.

This invention provides a remedy for these disadvantages. For this purpose, it provides the cyclical use of lead basic chloride $[PbCl_2.Pb(OH)_2]$ which has a crystalline structure.

Further it provides the use, by mixing it with an alkali metal chloride, of basic chloride of lead in excess with regard to the quantity of original nitric acid, to prevent the formation, at any time of the reaction, of a soluble lead salt.

According to my process, the regeneration of the basic chloride of lead in a crystalline state $[PbCl_2.Pb(OH)_2]$ from the chloride, may be obtained by the use of lime as well as by ammonia, which avoids any dependence of the formation of alkali metal nitrate on that of ammonium chloride.

The basic salt is used in limited quantity, so that it reacts only on half of the chlorine contained in the insoluble lead salt.

The annexed diagram shows, as an example only, one application of the process.

In a vessel I, crystalline basic chloride of lead and nitric acid are added to a solution of alkali metal chloride, in such quantities that the basic chloride is sufficiently in excess so that at any time of the reaction soluble nitrate of lead $Pb(NO_3)_2$ is not formed.

The mixture of the reaction in the vessel I, after filtering off the alkali metal nitrate, is treated in the vessel II with a limited quantity of ammonia or of lime so that it reacts only on half of the chlorine of the insoluble lead chloride, so as to form crystalline basic chloride of lead $[PbCl_2.Pb(OH_2]$ according to the following reaction: $2PbCl_2 + Ca(OH)_2 = [PbCl_2.Pb(OH)_2] + CaCl_2$.

The filtering and the washing of the crystalline basic chloride presents no difficulty and said basic chloride is returned to the vessel I in the cycle.

What I claim is:

1. A process of manufacturing alkali metal nitrates from the corresponding chlorides, comprising the steps of adding basic chloride of lead to alkali metal chloride and nitric acid, and of filtering off the alkali metal nitrates formed.

2. A process of manufacturing alkali metal nitrates from the corresponding chlorides, comprising the steps of adding basic chloride of lead to alkali metal chlorides and nitric acid, in a quantity in excess of the quantity of nitric acid used to prevent the formation of a soluble lead salt, and of filtering off the alkali metal nitrates formed.

3. A process of manufacturing alkali metal nitrates from the corresponding chlorides, comprising the steps of adding basic chloride of lead to alkali metal chlorides and nitric acid, in a quantity in excess of the quantity of nitric acid used, of separating therefrom the insoluble lead salt formed, and of transforming said insoluble salt into basic chloride by means of a basic salt used in limited quantity so as to react on one-half only of the chlorine contained in said insoluble lead salt.

In testimony whereof I affix my signature.
HENRI LAWARREE.